United States Patent
Lin et al.

(10) Patent No.: US 9,124,387 B2
(45) Date of Patent: Sep. 1, 2015

(54) DYNAMIC ADAPTION OF TRANSMISSION RATE FOR MULTIUSER MIMO NETWORKS

(71) Applicant: Academia Sinica, Taipei (TW)

(72) Inventors: Kate Ching-Ju Lin, Taipei (TW);
Wei-Liang Shen, Tainan (TW);
Shyamnath Gollakota, Seattle, WA (US); Dina Katabi, Cambridge, MA (US)

(73) Assignee: ACADEMIA SINICA, Taipei (TW)

( * ) Notice: Subject to any disclaimer, the term of this patent is extended or adjusted under 35 U.S.C. 154(b) by 157 days.

(21) Appl. No.: 13/900,637

(22) Filed: May 23, 2013

(65) Prior Publication Data
US 2014/0204776 A1   Jul. 24, 2014

(30) Foreign Application Priority Data
Jan. 23, 2013   (TW) .............................. 102102508 A

(51) Int. Cl.
*H04W 4/00* (2009.01)
*H04L 1/00* (2006.01)

(52) U.S. Cl.
CPC .................................. *H04L 1/0002* (2013.01)

(58) Field of Classification Search
None
See application file for complete search history.

(56) References Cited

U.S. PATENT DOCUMENTS

| | | | |
|---|---|---|---|
| 8,654,815 B1* | 2/2014 | Forenza et al. .............. | 375/141 |
| 8,699,424 B2* | 4/2014 | Chandra et al. .............. | 370/329 |
| 2006/0198460 A1* | 9/2006 | Airy et al. ..................... | 375/267 |
| 2006/0209980 A1* | 9/2006 | Kim et al. ..................... | 375/267 |
| 2006/0256848 A1* | 11/2006 | Medvedev et al. ........... | 375/227 |
| 2007/0041322 A1* | 2/2007 | Choi et al. .................... | 370/235 |
| 2007/0140363 A1* | 6/2007 | Horng et al. .................. | 375/260 |
| 2007/0147535 A1* | 6/2007 | Niu et al. ...................... | 375/267 |
| 2007/0183529 A1* | 8/2007 | Tujkovic et al. ............. | 375/267 |
| 2007/0206695 A1* | 9/2007 | Ye et al. ........................ | 375/267 |
| 2007/0223422 A1* | 9/2007 | Kim et al. ..................... | 370/334 |
| 2007/0242766 A1* | 10/2007 | Xu et al. ....................... | 375/260 |
| 2008/0137577 A1* | 6/2008 | Habetha ........................ | 370/311 |
| 2009/0010355 A1* | 1/2009 | Mori et al. .................... | 375/267 |
| 2010/0014453 A1* | 1/2010 | Erkip et al. ................... | 370/315 |
| 2010/0034309 A1* | 2/2010 | Su et al. ........................ | 375/267 |
| 2010/0061473 A1* | 3/2010 | Choi et al. .................... | 375/260 |
| 2010/0067401 A1* | 3/2010 | Medvedev et al. ........... | 370/253 |
| 2011/0002371 A1* | 1/2011 | Forenza et al. ............... | 375/227 |
| 2011/0176519 A1* | 7/2011 | Vitthaladevuni et al. ..... | 370/336 |
| 2011/0299480 A1* | 12/2011 | Breit et al. .................... | 370/329 |
| 2012/0263090 A1* | 10/2012 | Porat et al. .................... | 370/312 |
| 2013/0022021 A1* | 1/2013 | Wild et al. .................... | 370/330 |
| 2014/0044089 A1* | 2/2014 | Lopez et al. .................. | 370/330 |

OTHER PUBLICATIONS

Wei-Liang Shen, Yu-Chih Tung, Kuang-Che Lee, Kate Ching-Ju Lin, Shyamnath Gollakota, Dina Katabi and Ming-Syan Chen; Rate Adaptation for 802.11 Multiuser MIMO Networks; ACM MobiCom 2012; Aug. 23, 2012; Istanbul Turkey.

* cited by examiner

*Primary Examiner* — Anh-Vu Ly
(74) *Attorney, Agent, or Firm* — Bacon & Thomas, PLLC

(57) ABSTRACT

Dynamic adaption of transmission rate for multiuser MIMO networks is disclosed. The invention controls a first communication device to transmit data at rates optimal determined under the condition that the channel is occupied by the first communication device, a second communication device to transmit data at rates optimal determined under the condition that the channel is shared by the first and second communication devices and a third communication to transmit data at rates optimal determined under the condition that the channel is shared by the first, second and third communication device.

19 Claims, 5 Drawing Sheets

DYNAMIC ADAPTION OF TRANSMISSION RATE FOR MULTIUSER MIMO NETWORKS

RELATED PATENT APPLICATIONS

This Application claims priority benefit from Taiwan Patent Application Filing Number 102102508 filed on Jan. 23, 2013, the disclosure of which is incorporated here by reference in its entirety.

FIELD OF THE INVENTION

The present invention relates to dynamic adaption of transmission rate for multiuser MIMO system (multi-input, multi-output system), especially to method for dynamic adaption of transmission rate and method for control of data transmission, both used in data communication systems, and devices using such methods.

BACKGROUNDS OF THE INVENTION

The two trends in the wireless communication networks, in response to the needs in supporting multiple antennas, are the wireless data transmission system that supports multiple antennas and the system that supports multiple user and multiple antennas. The latter is referred to as "multiuser, multi-input multi-output system, the MU-MIMO system. In such a system, a plurality of user devices equipped with wireless router with multiple antennas simultaneously.

In the traditional wireless communication networks, at each time slot only one user device is allowed to transmit signals to the wireless router. At this time slot, the allowable transmission rate depends on the characteristics of the communication channel between the user device and the wireless transceiver. Since the channel characteristics won't change substantially during such time slot, the transmission rate may be set at the best ever transmission rate in history. That is, the transmitting terminal selects the best ever transmission rate to transmit signals. After the transmission rate is determined, data to be transmitted are encoded in accordance with the determined rate and the corresponding header is added. Then receiving terminal then uses the information provided in the header to decode the received signals, so to obtain the transmitted data.

In order to support the MIMO system, the nowadays systems use a modified decoder design at the receiving terminal. One of the technologies used to support the MIMO system is the "zero-forcing successive interference cancellation" (ZF-SIC) technology. The ZF-SIC technology enables the router to recover the respective data received from two user devices at the same time, so that multiple user devices may transmit data in one wireless system at one time.

In using the ZF-SIC technology, however, the existing systems did not consider the impact that the MIMO system brought to the data transmission rate. In other words, in determining the transmission rate, the existing systems simply select the best known rate recorded in the related user device and transmit data using the selected rate. Such policy does not guaranty the best transmission rate, because, as having been discussed in many publications, the possible best rate of the user device does not only relate to its own channel characteristics but also to the channel characteristics of other user devices that transmit data at the same time. In addition, under the MU-MIMO environment user devices that transmit data simultaneously are not a fixed group. Any device is allowed to join or leave the group at any time. Therefore, a packet of data transmitted by a use device may be received along with the packet transmitted by any of the other user devices. It is then important for the user devices to select the right transmission rate, rather than the best transmission rate, because, if all the user devices select the best rates, the transmission rates would be too high for the receiving side to recover the packets received. In addition, under the design of the MU-MIMO system, the wrong rate used by one user device does not only influence its own packets but also impact the correct decoding of the packets of other user devices. As a result, selecting the best transmission rates does not result in transmitting data at higher speeds. Rather, the whole network could shut down, due to failure in decoding the packets of data being transmitted.

OBJECTIVES OF THE INVENTION

The objective of this invention is to provide dynamic adaption of transmission rate for multiuser MIMO networks, whereby proper data transmission rates for respective user devices in a multiuser MIMO network may be determined. Another objective of this invention is to provide dynamic adaption of transmission rate for multiuser MIMO networks, whereby proper data transmission rates for respective user devices in a multiuser MIMO network may be dynamically determined.

SUMMARY OF THE INVENTION

An aspect of the dynamic adaption of transmission rate for multiuser MIMO networks according to the present invention relates to a method for adjusting data transmission rate in a wireless communication system comprising a wireless router provided with two antennas, whereby allowing at most two user devices to transmit data simultaneously. For the sake of convenience, in the followings the user device that first establishes communication channel with the wireless router will be referred to as the first user device and the user device that establishes communication channel with the wireless router while the communication channel of the first user device is in use will be referred to as the second user device. In this aspect the method of this invention comprises the steps of:

all user devices obtain channel information of their respective communication channels to the wireless router using the reciprocity method, when the wireless router broadcasts signals, and calculate the S/N rate (SNRori) of said channels;

a first user device transmits signals to the wireless router at a transmission rate determined according to its SNRori;

the first user device broadcasts channel information of the communication channel between the first user device and the wireless router;

a second user device detects data transmitted between the first user device and the wireless router and obtains the channel information of the first user device;

the second user device calculates an S/N rate (SNRproj) of the communication channel between the second user device and the wireless router, according to a relation between communication channel between the second user device and the wireless router and communication channel between the first user device and the wireless router; and the second user device determines transmission rate by adjusting transmission rate determined according to its SNRori using said obtained S/N rate SNRproj, whereby data transmission by the second user device won't impact data transmission by the first user device;

wherein the relation between communication channel between the second user device and the wireless router and communication channel between the first user device and the wireless router comprises an angle θ between channel direction ($h_1$) from the first user device to the wireless router and channel direction ($h_2$) from the second user device to the wireless router and wherein the S/N rate SNRproj is obtained from the formula of:

$$SNRproj=SNRori \times \sin^2(\theta).$$

In one preferred embodiment of this invention, the transmission rate selected by the second user device is a rate in which signals transmitted by the second user device don't interfere with signals transmitted by the first user device.

In order to enhance the utilization of the wireless communication channels all user devices stop their data transmission after a predetermined period of time and the steps described above repeat.

Another aspect of the dynamic adaption of transmission rate for multiuser MIMO networks according to the present invention relates to a method for controlling data transmission rate in a wireless communication system comprising a wireless router provided with three antennas, whereby allowing at most three user devices to transmit data simultaneously. For the sake of convenience, in the followings the user device that first establishes communication channel with the wireless router will be referred to as the first user device, the user device that establishes communication channel with the wireless router while the communication channel of the first user device is in use will be referred to as the second user device and the user device that establishes communication channel with the wireless router while the communication channels of the first and second user devices are in use will be referred to as the third user device. In this aspect the method of this invention comprises the steps of:

all user devices obtain channel information of their respective communication channels to the wireless router using the reciprocity method, when the wireless router broadcasts signals, and calculate the S/N rate (SNRori) of said channels;

a first user device transmits signals to the wireless router at a transmission rate determined according to its SNRori;

the first user device broadcasts channel information of the communication channel between the first user device and the wireless router;

a second user device detects data transmitted between the first user device and the wireless router and obtains the channel information of the first user device;

the second user device calculates an S/N rate (SNRproj) of the communication channel between the second user device and the wireless router, according to an angle $\theta_2$ between channel direction ($h_2$) from the second user device to the wireless router and channel direction ($h_1$) from the first user device to the wireless router to determine its data transmission rate;

the second user device determines transmission rate by adjusting transmission rate determined according to its SNRori using said obtained S/N rate SNRproj, whereby data transmission by the second user device won't impact data transmission by the first user devices;

the second user device broadcasts channel information of the communication channel between the second user device and the wireless router, including said adjusted transmission rate, and the first user device stops transmitting signals to the wireless router, when the second broadcasts its channel information;

a third user device obtains channel information of the second user device, when the second user device broadcasts its channel information;

the first and second user devices transmit signals to the wireless router, after the second user device stops broadcasting its channel information;

the third user device calculates an S/N rate (SNRproj) of the communication channel between the third user device and the wireless router, according to a relation among communication channel between the third user device and the wireless router, communication channel between the first user device and the wireless router and communication channel between the second user device and the wireless router; and the third user device determines transmission rate by adjusting transmission rate determined according to its SNRori using said obtained S/N rate SNRproj, whereby data transmission by the third user device won't impact data transmission by the first and second user devices;

wherein the relation among communication channel between the third user device and the wireless router, communication channel between the second user device and the wireless router and communication channel between the first user device and the wireless router comprises an angle $\theta_3$ between channel direction ($h_3$) from the third user device to the wireless router and a plane form by channel direction ($h_1$) from the first user device to the wireless router and channel direction ($h_2$) from the second user device to the wireless router and wherein the S/N rate SNRproj of the third user device is obtained from the formula of:

$$SNRproj=SNRori \times \sin^2(\theta_3).$$

In one preferred embodiment of this invention, the transmission rate selected by the third user device is a rate in which signals transmitted by the third user device don't interfere with signals transmitted by the first and second user devices.

In order to enhance the utilization of the wireless communication channels all user devices stop their data transmission after a predetermined period of time and the steps described above repeat.

The third aspect of the dynamic adaption of transmission rate for multiuser MIMO networks according to the present invention relates to a method for controlling data transmission rate in a wireless communication system comprising a wireless router provided with N antennas, wherein N is a natural number equal to or greater than 4, whereby allowing at most N user devices to transmit data simultaneously. For the sake of convenience, in the followings the user device that first establishes communication channel with the wireless router will be referred to as the first user device, the user device that establishes communication channel with the wireless router while the communication channel of the first user device is in use will be referred to as the second user device and the user device that establishes communication channel with the wireless router while the communication channels of the first and second user devices are in use will be referred to as the third user device. And so on. In this aspect the method of this invention comprises the steps of:

all user devices obtain channel information of their respective communication channels to the wireless router using the reciprocity method, when the wireless router broadcasts signals, and calculate the S/N rate (SNRori) of said channels;

a first user device transmits signals to the wireless router at a transmission rate determined according to its SNRori;

the first user device broadcasts channel information of the communication channel between the first user device and the wireless router;

a second user device detects data transmitted between the first user device and the wireless router and obtains the channel information of the first user device;

the second user device calculates an S/N rate (SNRproj) of the communication channel between the second user device and the wireless router, according to an angle $\theta_2$ between channel direction ($h_2$) from the second user device to the wireless router and channel direction ($h_1$) from the first user device to the wireless router to determine its data transmission rate;

the second user device determines transmission rate by adjusting transmission rate determined according to its SNRori using said obtained S/N rate SNRproj, whereby data transmission by the second user device won't impact data transmission by the first user devices;

the second user device broadcasts channel information of the communication channel between the second user device and the wireless router, including said adjusted transmission rate, and the first user device stops transmitting signals to the wireless router, when the second broadcasts its channel information;

the Kth (K is a natural number greater than 2 and equal to or smaller than N) user device obtains channel information of the K−1th user device;

the first to K−1th user devices transmit signals to the wireless router, after the K−1th user device stops broadcasting its channel information;

the Kth user device calculates an S/N rate (SNRproj) of the communication channel between the Kth user device and the wireless router, according to an angle $\theta_K$ between channel direction ($h_K$) from the Kth user device to the wireless router and a plane form by channel directions ($h_1$–$h_{K-1}$) from the first to K−1th user devices to the wireless router;

the Kth user device determines transmission rate by adjusting transmission rate determined according to its SNRori using said obtained S/N rate SNRproj, whereby data transmission by the second user device won't impact data transmission by the first to K−1th user devices;

if K=N, the operation stops; otherwise:

the Kth user device broadcasts its channel information and the first to K−1th user devices stop their data transmission, when the Kth user device broadcasts its channel information, whereby the K+1th user device obtains channel information of the Kth user device and adjust transmission rate between the K+1th user device and the wireless router, using the channel information of the first to Kth devices; and the first to Kth user devices transmit signals to the wireless router, after the second user device stops broadcasting its channel information;

wherein the S/N rate (SNRproj) of the communication channel between the Kth user device and the wireless router is obtained from the formula of:

$$SNRproj = SNRori \times \sin^2(\theta_K).$$

In one preferred embodiment of this invention, the transmission rate selected by the Kth user device is a rate in which signals transmitted by the Kth user device don't interfere with signals transmitted by the first to K−1th user devices.

In order to enhance the utilization of the wireless communication channels all user devices stop their data transmission after a predetermined period of time and the steps described above repeat.

In the present invention, the channel direction $h_n$ is the channel vectors of the user devices, wherein $hn=(h_{n1}, h_{n2}, \ldots, h_{nm})$, is a natural number and m is the number of the user devices. $h_{n1}, h_{n2}, \ldots, h_{nm}$ are complex numbers and are represented by a+bi, a, b ∈ R. The values of $h_n$ may be obtained from measurement equipments.

These and other objectives and advantages of this invention will be clearly understood from the detailed description by referring to the following drawings.

DETAILED DESCRIPTION OF THE INVENTION

Figure 1:
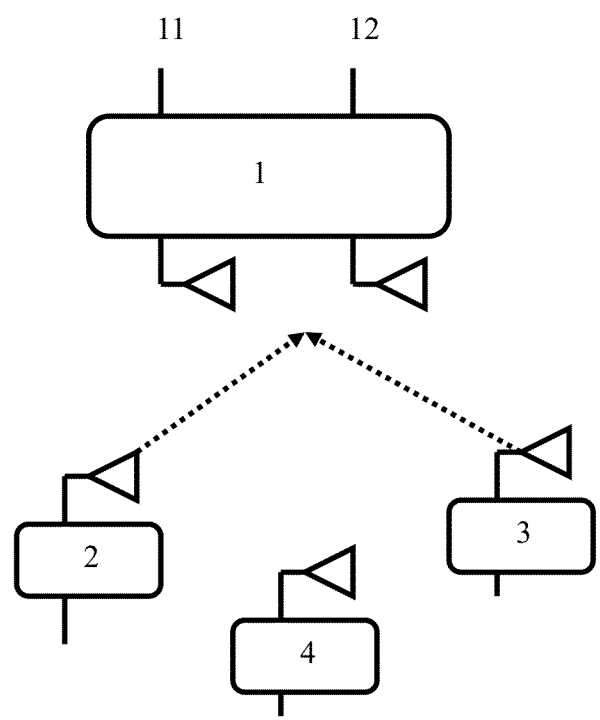
FIG. 1 is the schematic drawing of the dynamic adaption of transmission rate for multiuser MIMO networks according to this invention.

FIG. 1 is the schematic drawing of the dynamic adaption of transmission rate for multiuser MIMO networks according to this invention. In the drawing, shown is a wireless communication system for multiple users. The system has a wireless router 1 equipped with 2 antennas 11, 12, to exchange data with a plurality of user devices 2, 3 and 4. The wireless router 1 may be any multiple antenna wireless router that supports the multiuser applications, such as wireless router, wireless access point etc. In such cases, the user devices 2, 3, 4 may be a personal computer, notebook computer, intelligent handset, personal digital aid, flat computer or other devices equipped with the wireless communication capabilities.

FIG. 1 shows a first user device 2 and a second user device 3 have established their communication channels with the wireless router 1. FIG. 1 also shows the 2 antennas 11, 12 of the wireless router 1 receive the signals transmitted by the first user device 2 and the second user device 3, respectively, at the same time. At this time, the wireless router 1 must recover the respective signals provided by the first and second user devices 2, 3 from the received signals. Although there are many methods available in recovering the signals, the ZF-SIC (zero-forcing successive interference cancellation) method is one of the most popular methods used in the industry. In the followings, the method to recover the respectively transmitted signals will be described, using the ZF-SIC method as example.

Assuming that at a time point the first user device 2 is the first user device that establishes its communication channel with the wireless router 1, the first user device 2 will transmit a data string to the wireless router 1 at a transmission rate, such as a second transmission rate. The second transmission rate may be determined using any useful method. One possible method is selecting the best known rate recorded in the first user device 2. In selecting the best known rate, a look-up-table may be established in the first user device 2. In the table, certain S/N rates and their corresponding best transmission rates are recorded. Given an S/N rate, its corresponding best rate may be easily selected from the table. Such a method is well-known to those skilled in the art. Suppose the wireless router 1 has 2 antennas 11 and 12, the signal strings from the first user device may be projected to the plane defined by the 2 antennas and the projections form a vector $h_1=(h_{11}, h_{12})$. Thereafter, the second user device 3 establishes its communication channel with the wireless router 1. At this time, the second user device 3 will transmit a data string to the wireless router 1 at a transmission rate, such as a first transmission rate. The first transmission rate may be determined using any useful method, such as the best known rate. When this happens, the wireless router 1 uses the Zero-Forcing method to project the received data strings to a direction perpendicular to the channel direction t of the first user device 2, in order to recover the data transmitted by the second user device 3.

Figure 2A:
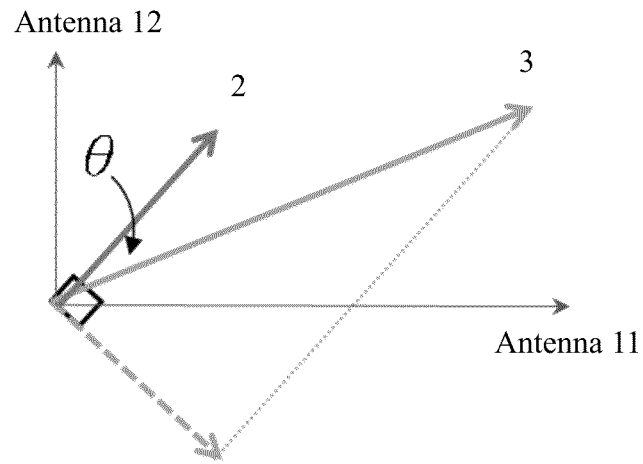
FIG. 2A shows the application of the ZF-SIC method in the present invention.

By using such as the above-described projection method, the wireless router 1 is able to remove from the signals received from the second user device 3 the influences generated by the signals transmitted by the first user device, to accomplish correct decoding of the signals provided by the second user device 3. In addition, the wireless router 1 also uses the "Successive Interference Cancellation" method to re-decode the signal strings from the first user device 2, i.e., to first remove elements generated by the signals of the second user device 3 then to decode the remains of the signals, which represent the signal elements provided by the first user device 2. These steps are the so-called ZF-SIC method and are widely used in the industry. FIG. 2A illustrates how the ZF-SIC method is utilized in the embodiments of this invention.

In the steps described above, if the signals from the second user device 3 are not correctly decoded, correctly recovering the signals transmitted by the first user device 2 may not be realized. The reason is, since signal elements representing signals from the second user device 3 are not correctly recovered, correctly removing signals elements pertaining to the second user device 3 from the received signals to obtain signals from the first user device 2 is not possible.

In addition, in the steps described above, projecting the signals of the second user device 3 would make the signals decay. When this happens, the second user device 3 will need to adjust its data transmission rate; otherwise, the communication quality of the channel used by the first user device 2 will be damaged. The existing technology does not provide any solution for this technical problem. Therefore, the second_user device would simply maintain its original transmission rate, until the wireless router 1 shuts down all communication channels after a predetermined period of time and starts to accept the requests from the user devices 2, 3, 4. By then, all the received signals are not decodable and all the user device need to resend the signals they have already transmitted.

Figure 2B:
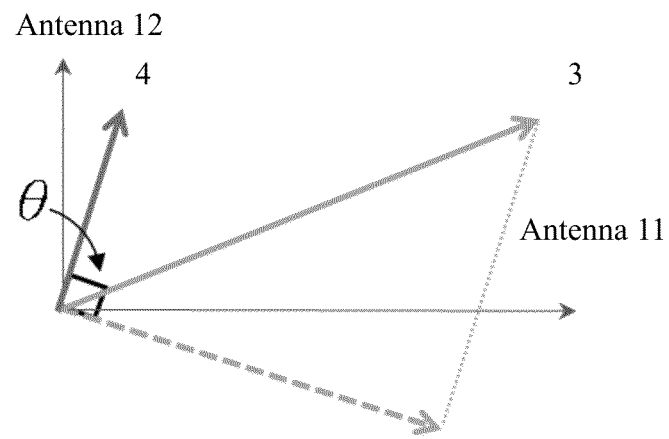
FIG. 2B shows the application of the ZF-SIC method in the present invention, after a communication channel switches to another user device.

From FIG. 2A it may also be appreciated that, when both the second user device 3 and the third user device 4 have established their communication channels with the wireless router 1 and transmit their signals simultaneously, the channel quality of the second user device 3 would be totally different from that shown in FIG. 2A. This is shown in FIG. 2B, in which the second user device 3 is allowed to transmit signals at a rate higher than the case of FIG. 2A, because the angle formed by the communication channels of the second user device 3 and the third user device 4 is wider than the angle formed by the communication channels of the first user device 2 and the second user device 3, as shown in FIG. 2A.

Although it is not intended to limit the present invention to any theory, it has been found that the channel quality of the second user device 3 is directly affected by the first user device 2, whereby the transmission rate determined upon establishment of its communication channel would become impracticable. In addition, the influences brought to the channel quality, i.e., the S/N rate, of the second user device 3 by the first user device 2, may be calculated, using the channel directions of the 2 user devices. In other words, the S/N rate of the communication channel between the second user device 3 and the wireless router 1, SNRproj, under the influences of the first user device 2, may be obtained from the following formula:

$$SNR_{proj}=SNR_{ori} \times \sin^2(\theta) \quad (1)$$

wherein

SNRproj is the S/N rate of the signals from the second user device 3 when decoded by the wireless router;

SNRori is the S/N rate of the signals from the second user device 3 when transmitted alone;

$\theta$ is the angle between the channel direction of the second user device 3 and the plane formed by the channel directions $(h_1, h_2, \ldots, h_n)$ of all other user device in use.

Here, the "channel direction" $h_n$ denotes to vectors representing the communication channels between the respective user devices to the wireless router, $h_n=(h_{n1}, h_{n2}, \ldots, h_{nm})$ wherein n is a natural number and m represents number of antennas provided with the wireless router. Each of the $h_n$ is a complex number and may be represented by a+bi, a, b ∈ R. The values of the vectors may be obtained from the measurement equipments. FIG. 2A illustrates the channel directions relating to 2 antennas and the angle between the channel directions.

In the present invention the SN rate (SNRori) of communication channel of a user device when transmitting signals alone may be calculated using the reciprocity method. In application, the wireless router 1 generates predetermined signals periodically so that all the user devices 2, 3, 4 may use the signals they receive to estimate the SN rate, SNRori, of their communication channels when transmitting signals alone. Such reciprocity method has been disclosed in many technical publications and is well known to those skilled in the art. For sake of simplicity, the reciprocity approach may be understood as: The communication channel from one user device to the wireless router is equal to the communication channels from the wireless router to all the other user devices. Therefore, characteristics of the communication channel from a user device may be estimated according to the signals generated by the wireless router to the user device. Since the reciprocity method is well known, detailed description thereof is thus omitted.

In order to calculate the angle between the channel directions of one user devices and the channel direction of other user devices, the one user device needs to obtain information representing the channel direction of the other user devices. That is, within a predetermined period of time right after a user device, such as the first user device 2, establishes its communication channel with the wireless router, it broadcasts its channel direction to all the other user devices 3 and 4, so that user devices 3 and 4 may use the information received from the first user device 2 to calculate the actual S/N rate, SNRproj, of their respective communication channels, according to Formula 1 shown above.

As the actual S/N rate is known, the second user device 3 is now able to adjust its data transmission rate in accordance with the actual S/N rate, SNRproj, so to transmit signals at the practicably best rate. In application, the adjustment may be made using any known method. In the preferred embodiments of this invention, the adjustment is made by increasing or decreasing the transmission rate, so that the adjusted rate is the best (highest) rate under the condition that signals transmitted by the second user device do not impact the channel quality of other user devices in use, such as the first user device. Of course, other methods for the adjustment of the transmission rate may also be used in this invention, to obtain the same or similar effects.

As the method for controlling data transmission rate of this invention has described above, the steps that implement the invented method will be described by referring to FIG. 3, which is flowchart for the method for controlling data transmission rate in a wireless communication system of this invention.

Figure 3:
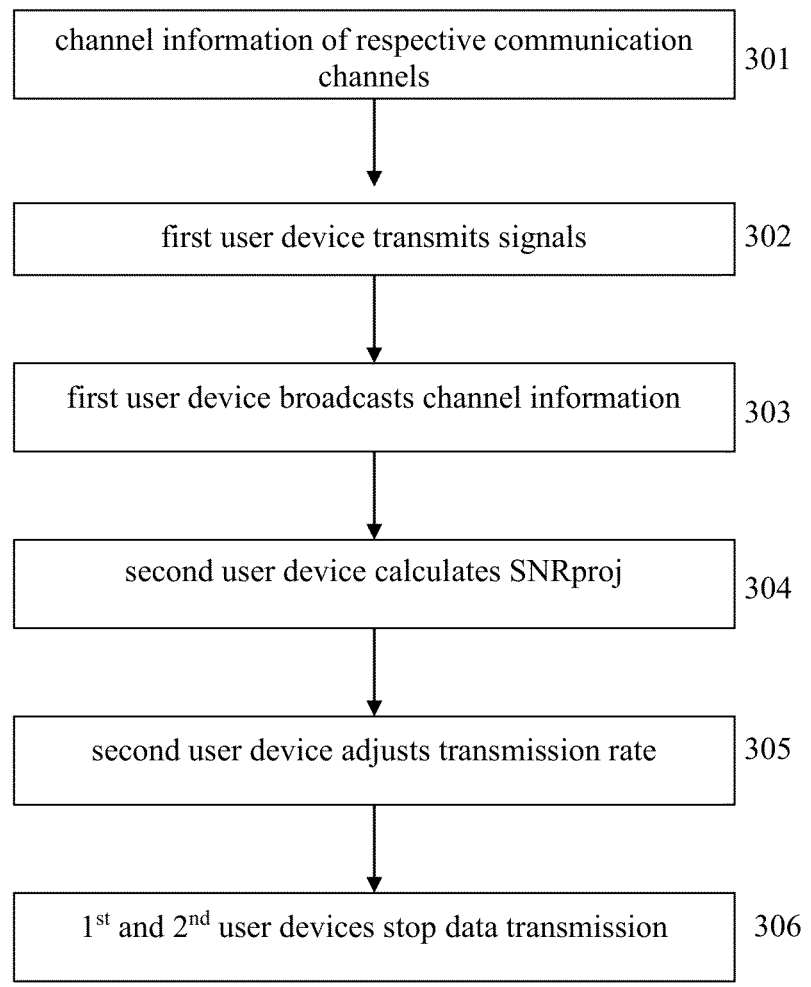
FIG. 3 is flowchart for one embodiment of the method for controlling data transmission rate in a wireless communication system of this invention.

As shown in FIG. 3, at 301, when the wireless router 1 broadcasts signals, all user devices 2, 3, 4 receive the broadcasted signals and use them to calculate the channel information of their respective communication channels to the wireless router 1, using the reciprocity method. The channel information is later used to calculate the S/N rate, SNRori, of the communication channels, when transmitting signals alone. At 302 the first user device 2 successfully establishes its communication channel with the wireless router 1 and transmits signals to the wireless router 1, at a rate selected according to the calculated SNRori. At 303 the first user device 2 broadcasts its channel information. At 304 the second user device 3 detects and receives the channel information of the first user device 2, then calculates the S/N rate, SNRproj, of its communication channel to the wireless router 1, under the influence of the first user device 2. At 305 the second user device 3 uses the S/N rate SNRproj to adjust its transmission rate and starts to transmit signals at the adjusted rate. After a predetermined period of time, at 306 both user devices stop their data transmission operation. In this embodiment, the second user device 3 uses Formula 1 as shown above to calculate the actual S/N rate, SNRproj.

It is appreciated that in this embodiment the method for adjusting transmission rate of this invention is used in the second user device 3. The second user device 3 adjusts its transmission rate by referring to the channel direction of the first user device 2.

In the previous embodiment, however, although the wireless router 1 might be designed to support more than 2 user devices, after the first and second user devices 2 and 3 have established their communication channels with the wireless router 1, a third user device, say the third user device 4, has no sufficient information to calculate the actual S/N rate (SNRproj) of its communication to the wireless router under the influence of the first and second user devices 2 and 3, after the third user device 4 has established the communication channel. This is because the channel information of the second user device 3 is unknown to the third user device 4, since the each user device has only one antenna and, after the second user device 3 starts to transmit signals, signals received by the third user device 4 would include the signal elements from both the first user device and the second user device.

In order to solve this problem and to enable the application of the present invention in wireless communication systems supporting 3 or more user devices, the second embodiment of this invention provides a mechanism to enable the third and further user devices to obtain channel information of all the user devices that has previously established their communication channels with the wireless router. This embodiment will be described in the followings, using a 3-antennal system as example. For systems that support more than 3 user devices, the implementations would be appreciated by inference based on the following example.

Figure 4:
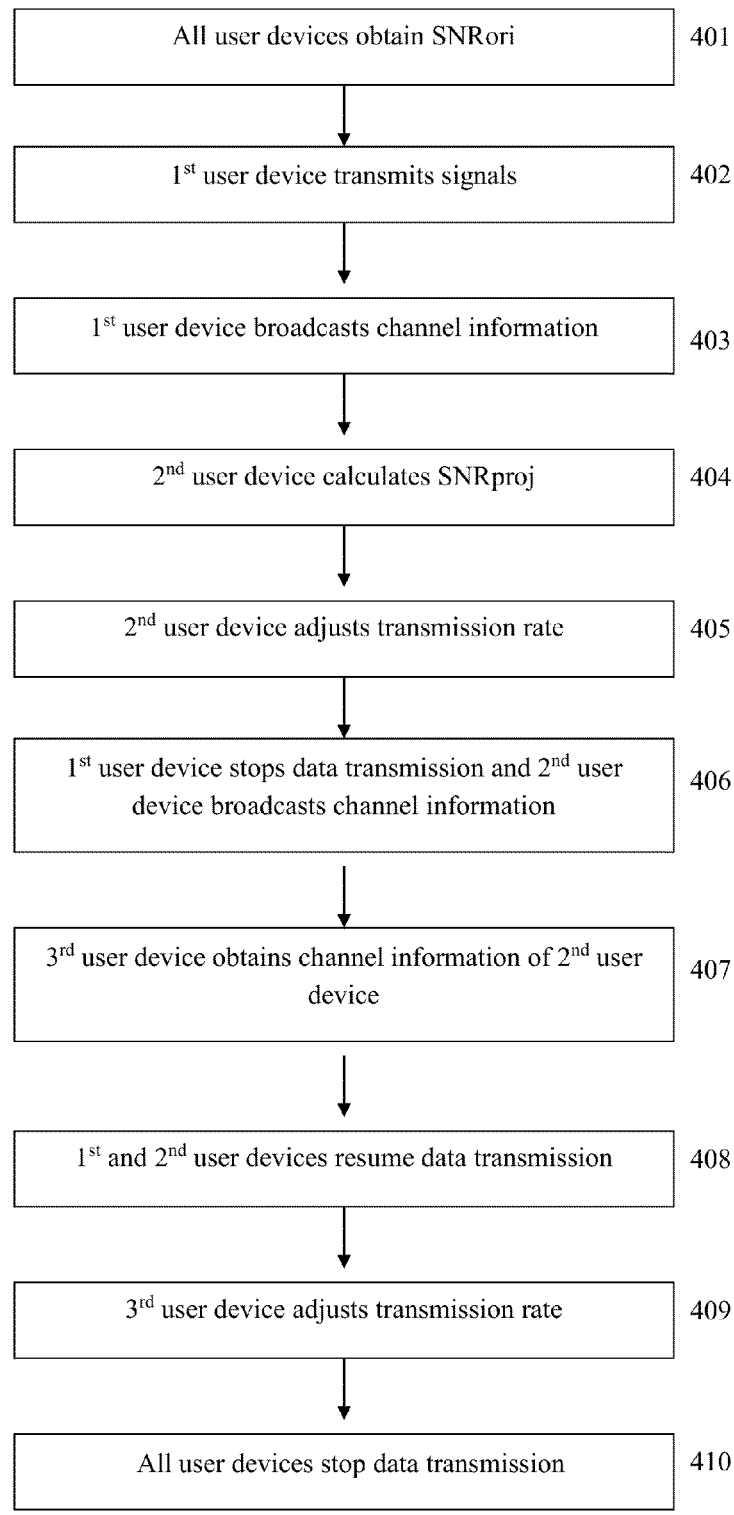
FIG. 4 is flowchart for another embodiment of the method for controlling data transmission rate in a wireless communication system of this invention.

FIG. 4 is flowchart for the second embodiment of the method for controlling data transmission rate in a wireless communication system according to this invention. As shown in FIG. 4, at 401, when the wireless router 1 broadcasts signals, all user devices 2, 3, 4 receive the broadcasted signals and use them to calculate the channel information of their respective communication channels to the wireless router 1, using the reciprocity method. The channel information is later used to calculate the S/N rate, SNRori, of the communication channels, when transmitting signals alone. At 402 the first user device 2 successfully establishes its communication channel with the wireless router 1 and transmits signals to the wireless router 1, at a rate selected according to the calculated SNRori. At 403 the first user device 2 broadcasts its channel information. At 404 the second user device 3 and the third user device 4 detect to receive the channel information of the first user device 2, then the second user device 3 calculates the S/N rate, SNRproj, of its communication channel to the wireless router 1, under the influence of the first user device 2. At 405 the second user device 3 uses the S/N rate SNRproj to adjust its transmission rate and starts to transmit signals at the adjusted rate. At 406 the first user device 2 stops its data transmission and the second user device 3 broadcasts channel information between itself and the wireless router 1. Here, the first user device 2 may choose to transmit null signals instead of transmitting no signals. During the period the first user device 2 stops the data transmission, at 407 the third user device 4 detects to obtain the channel information of the second user device 3. At this step, the third user device 4 has obtained the channel information of the first and second user devices 2, 3, respectively. It then calculate the actual S/N rate, SNRproj, of its communication channel to the wireless router, using the channel information of the first and second user devices 2, 3 as reference. At 408 both the first and second user devices 2, 3 resume their data transmission. At 409, the third user device 4 uses the obtained S/N rate (SNRproj) to adjust its transmission rate and starts to transmit signals at the adjusted rate.

This embodiment may further include a step, that is, after a predetermined period of time, at 410 the wireless router stops to receive data transmission from the user devices. All the user devices then start to compete in establishing communications with the wireless router 1.

In this embodiment, the first user device 2 transmits signals at a rate determined in accordance with the S/N rate (SNRori) first detected. The second user device 3 considers its channel characteristics and the channel characteristics of the first user device 2 in calculating the actual S/N rate (SNRproj) and selects the best corresponding rate from a look-up-table. Similarly, the third user device 4 considers its channel characteristics and the channel characteristics of the first and second user devices 2, 3 in calculating the actual S/N rate (SNRproj) and selects the best corresponding rate from a look-up-table. And so on.

The present invention provides a control device to control the data transmission rates in a wireless communication system, which comprises a wireless router provided with 2 or more antennas and supports 2 or more user devices. The control process used in the control device includes the steps shown in FIG. 4 and its description.

Figure 5:
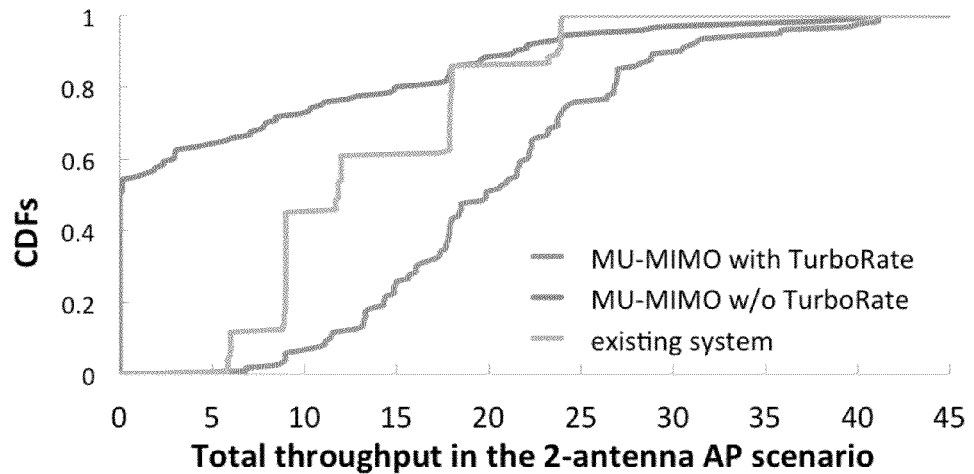
FIG. 5 shows comparisons between the present invention and the known art in their total transmission rate, when used in a 2-antenna system.
Figure 6:
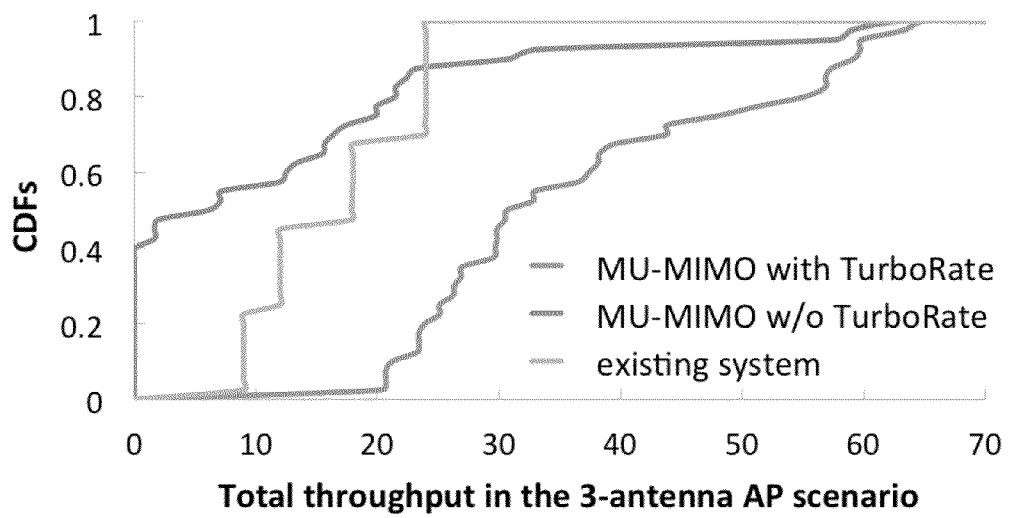
FIG. 6 shows comparisons between the present invention and the known art in their total transmission rate, when used in a 3-antenna system.

In order to prove the effects of this invention, wireless routers provided with 2 and 3 antennas and supporting 2 and 3 user devices, respectively, are prepared. User devices are used to transmit signals to the wireless router at rates determined according to this invention, rates determined according to SNRori and rates determined according to the conventional IEEE 802.11 standard, respectively. The test results are shown in FIGS. 5 and 6, wherein FIG. 5 shows comparisons among the present invention (MU-MIMO with TurboRate), transmission at rate determined by the SNRori (MU-MIMO w/o TurboRate) and the conventional IEEE 802.11 standard (existing system) in their total transmission rate, when used in a 2-antenna system and FIG. 6 shows comparisons among the present invention (MU-MIMO with TurboRate), transmission at rate determined by the SNRori (MU-MIMO w/o TurboRate) and the conventional IEEE 802.11 standard (existing system) in their total transmission rate, when used in a 3-antenna system. As shown in the results, the total transmission rate of this invention is 1.7 times the conventional technology in the case of 2-antenna system and is 2.3 times in the case of 3-antenna system. In an MU-MIMO system, if the influence of other user devices is not considered, the user devices could select a transmission rate that makes the router unable to decode the signals from the user devices, making the total transmission rate 1, as shown in MU-MIMO w/o TurboRate in the figures.

As the present invention has been shown and described with reference to preferred embodiments thereof, those skilled in the art will recognize that the above and other changes may be made therein without departing from the spirit and scope of this invention.

What is claimed is:

1. A method for determination of transmission rate in a wireless communication comprising a wireless router and a plurality of user devices, comprising the steps of:
   all user devices obtain channel information of their respective communication channels from the wireless router using a reciprocity method, when the wireless router broadcasts signals, and calculate the S/N rate (SNRori) of said channels;
   a user device transmits signals to the wireless router at a transmission rate determined by SNRori;
   said user device detects another user device that transmits signals to the wireless router, to obtain channel information of the other user device;
   said user device uses relation between its channel information and the channel information of the other user device to calculate an actual S/N rate (SNRproj) of its communication channel under the influence of the other user device;
   said user device uses the obtained SNRproj to adjust said transmission rate and starts to transmit signals; and
   after a predetermined period time, the wireless router stops to accept data transmission from all user devices.

2. The method according to claim 1, wherein the relation between its channel information and the channel information of the other user device includes angle θ between a channel direction from said user device to the wireless router and a channel direction from said other user device to the wireless router.

3. The method according to claim 2, wherein the channel direction $h_n$ is channel vectors of a user device, wherein $h_n = (h_{n1}, h_{n2}, \ldots, h_{nm})$, n is a natural number and m is number of antenna provided in the wireless router.

4. The method according to claim 2, wherein the S/N rate (SNRproj) of the communication channel is obtained from the formula of:

$$SNRproj = SNRori \times \sin^2(\theta).$$

5. The method according to claim 1, wherein the transmission rate is adjusted, such that data transmission by said user device will not impact data transmission by the other user device.

6. A method for controlling data transmission rate in a wireless communication system comprising a wireless router and at least 2 user devices, comprising the steps of:
   all user devices obtain channel information of their respective communication channels from the wireless router using a reciprocity method, when the wireless router broadcasts signals, and calculate the S/N rate (SNRori) of said channels;
   a first user device transmits signals to the wireless router at a transmission rate determined according to its SNRori;
   the first user device broadcasts channel information of its communication channel;
   a second user device detects signals transmitted by the first user device and obtains the channel information of the first user device;
   the second user device calculates an S/N rate (SNRproj) its communication channel, according to a relation between communication channels between the first and second user devices; and
   the second user device determines a transmission rate by adjusting transmission rate determined according to its SNRori using said calculated S/N rate (SNRproj);
   the second user device starts signal transmission at the adjusted rate; and
   after a predetermined period time, the wireless router stops to accept data transmission from all user devices.

7. The method according to claim 6, wherein the relation between communication channels between the first and second user devices comprises an angle θ between channel direction from the first user device to the wireless router and channel direction from the second user device to the wireless router.

8. The method according to claim 7, wherein the channel direction $h_n$, is channel vectors of a user device, wherein $h_n = (h_{n1}, h_{n2}, \ldots, h_{nm})$, n is a natural number and m is number of antenna provided in the wireless router.

9. The method according to claim 7, wherein the S/N rate (SNRproj) of the communication channel is obtained from the formula of:

$$SNRproj = SNRori \times \sin^2(\theta).$$

10. The method according to claim 6, wherein the transmission rate of the second user device is so adjusted, that data transmission by said second user device will not impact data transmission by the first user device.

11. A method for controlling data transmission rate in a wireless communication system comprising a wireless router and at least 3 user devices, comprising the steps of:
    all user devices obtain channel information of their respective communication channels from the wireless router using a reciprocity method, when the wireless router broadcasts signals, and calculate the S/N rate (SNRori) of said channels;
    a first user device transmits signals to the wireless router at a transmission rate determined according to its SNRori;
    the first user device broadcasts channel information of its communication channel;
    a second user device and a third user device detect data transmitted between the first user device and the wireless router and obtain the channel information of the first user device;
    the second user device calculates an S/N rate (SNRproj) of its communication channel, according to an angle $\theta_2$ between channel direction ($h_2$) of the second user device and channel direction ($h_1$) of the first user device;
    the second user device determines a transmission rate by adjusting transmission rate determined according to its SNRori using said calculated S/N rate (SNRproj);
    the second user device starts to transmit signals at the adjusted rate and broadcasts its channel information, and the first user device stops transmitting data to the wireless router;

the third user device obtains channel information of the second user device, when the second user device broadcasts its channel information;

the first and second user devices transmit signals to the wireless router, after the second user device stops broadcasting its channel information;

the third user device calculates an S/N rate (SNRproj) of its communication channel, according to a relation among its communication channel and communication channels of the first and second user devices; and the third user device determines transmission rate by adjusting transmission rate determined according to its SNRori using said calculated S/N rate (SNRproj);

the third user device starts to transmit signals at the adjusted rate; and after a predetermined period of time, the wireless router stops to accept data transmission from all user devices.

12. The method according to claim 11, wherein the relation among communication channels of the first, second and third user devices comprises an angle θ between channel direction of the third user device and the plane formed by channel directions of the second and third user devices.

13. The method according to claim 12, wherein the channel direction $h_n$, is channel vectors of a user device, wherein $h_n=(h_{n1}, h_{n2}, \ldots, h_{nm})$, n is a natural number and m is number of antenna provided in the wireless router.

14. The method according to claim 12, wherein the S/N rate (SNRproj) of the communication channel is obtained from the formula of:

SNRproj=SNRori×sin²(θ).

15. The method according to claim 11, wherein the transmission rate of the third user device is so adjusted, that data transmission by said third user device will not impact data transmission by the first and second user devices.

16. A method for controlling data transmission rate in a wireless communication system comprising a wireless router and N user devices, where N is an integer, comprising the steps of:

all user devices obtains channel information of their respective communication channels from the wireless router using a reciprocity method, when the wireless router broadcasts signals, and calculate the S/N rate (SNRori) of said channels;

a first user device transmits signals to the wireless router at a transmission rate determined according to its SNRori;

the first user device broadcasts channel information of its communication channel;

a second user device detects data transmitted between the first user device and the wireless router and obtains the channel information of the first user device;

the second user device calculates an S/N rate (SNRproj) of its communication channel, according to an angle $θ_2$ between channel direction ($h_2$) of the second user device and channel direction ($h_1$) of the first user device;

the second user device determines a transmission rate by adjusting transmission rate determined according to its SNRori using said calculated S/N rate (SNRproj);

the second user device starts to transmit signals at the adjusted rate and broadcasts its channel information, and the first user device stops transmitting signals to the wireless router, when the second broadcasts its channel information;

the Kth user device obtains channel information of the K−1th user device, wherein K is a natural number greater than 2 and equal to or smaller than N;

the first to K−1th user devices transmit signals to the wireless router, after the K−1th user device stops broadcasting its channel information;

the Kth user device calculates an S/N rate (SNRproj) of a communication channel between the Kth user device and the wireless router, according to an angle θK between channel direction ($h_K$) from the Kth user device to the wireless router and a plane form by channel directions ($h_1$-$h_{K-1}$) from the first to K−1th user devices to the wireless router;

the Kth user device determines transmission rate by adjusting transmission rate determined according to its SNRori using said calculated S/N rate (SNRproj), if K=N, the operation stops; otherwise:

the Kth user device broadcasts its channel information and the first to K−1th user devices stop their data transmission, when the Kth user device broadcasts its channel information, whereby the K+1th user device obtains channel information of the Kth user device and adjust transmission rate between the K+1th user device and the wireless router, using the channel information of the first to Kth devices; and the first to Kth user devices transmit signals to the wireless router, after the K+1th user device stops broadcasting its channel information.

17. The method according to claim 16, wherein the channel direction $h_i$, is channel vectors of a user device, wherein $h_n=(h_{n1}, h_{n2}, \ldots, h_{nm})$, n is a natural number and m is number of antenna provided in the wireless router.

18. The method according to claim 16, wherein the S/N rate (SNRproj) of the communication channel is obtained from the formula of:

SNRproj=SNRori×sin²($θ_K$).

19. The method according to claim 16, wherein the transmission rate of the Kth user device is so adjusted, that data transmission by said Kth user device will not impact data transmission by the first to K−1th user devices.

* * * * *